US012686493B2

(12) United States Patent
Zeleznak et al.

(10) Patent No.: US 12,686,493 B2
(45) Date of Patent: Jul. 21, 2026

(54) PRECISION AIRDROP SYSTEM AND METHOD

(71) Applicant: HONEYWELL INTERNATIONAL INC., Charlotte, NC (US)

(72) Inventors: Luke Zeleznak, Phoenix, AZ (US); George Rajan Koilpillai, Bangalore (IN); Michael Jirjis, Minneapolis, MN (US); Tracy Sellin, Minneapolis, MN (US); Daniel Bernard, Minneapolis, MN (US); Matthew Wiebold, Phymouth, MN (US); Janaki Seetharaman, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 27 days.

(21) Appl. No.: 18/796,868

(22) Filed: Aug. 7, 2024

(65) Prior Publication Data

US 2025/0333166 A1 Oct. 30, 2025

(30) Foreign Application Priority Data

Apr. 24, 2024 (IN) .............................. 202411032463

(51) Int. Cl.
*B64D 1/12* (2006.01)
*G01P 5/00* (2006.01)
(Continued)

(52) U.S. Cl.
CPC ................ *B64D 1/12* (2013.01); *G01P 5/001* (2013.01); *G01S 17/95* (2013.01); *G05D 1/665* (2024.01); *G05D 2109/20* (2024.01)

(58) Field of Classification Search
CPC ........... B64D 1/12; G01P 5/001; G01S 17/95; G05D 1/665; G05D 2109/20
See application file for complete search history.

(56) References Cited

U.S. PATENT DOCUMENTS

| | | | |
|---|---|---|---|
| 8,781,719 B1 | 7/2014 | Bernhardt | |
| 8,930,049 B2 | 1/2015 | Mamidipudi et al. | |

(Continued)

FOREIGN PATENT DOCUMENTS

| | | |
|---|---|---|
| CN | 109878730 B | 1/2020 |
| CN | 113568437 B | 2/2022 |

(Continued)

OTHER PUBLICATIONS

Cacan Martin et al: "Utilizing 1-15 G05D ground-based LIDAR measurements to aid autonomous airdrop systems", Proceedings of the Institution of Mechanical Engineers, Part G: Journal of Aerospace Engineering, vol. 231, No. 10, May 3, 2017 (May 3, 2017), pp. 1763-1778, XP093283579, United Kingdom.

(Continued)

*Primary Examiner* — Russell Frejd
(74) *Attorney, Agent, or Firm* — Ingrassia, Fisher & Lorenz LLP

(57) ABSTRACT

A system and method for calculating a flight plan and a precision release point for an aircraft carrying a payload includes supplying, from a four-dimensional (4D) wind measurement system, 4D wind data indicative of atmospheric wind velocity and direction (i) at and within a first threshold distance around a current flight level of the aircraft, (ii) at and within a second threshold distance around a drop zone for the payload, and (iii) at and within a third threshold distance around a plurality of different altitudes. The 4D wind data is continuously sampled, in a processing system, and is iteratively processes, in the processing system, to calculate, using a release point model implemented in the processing system, a flight plan for the aircraft and a precision release point for the payload.

17 Claims, 4 Drawing Sheets

(51) Int. Cl.
| | |
|---|---|
| *G01S 17/95* | (2006.01) |
| *G05D 1/656* | (2024.01) |
| *G05D 109/20* | (2024.01) |

(56) References Cited

U.S. PATENT DOCUMENTS

| | | | | |
|---|---|---|---|---|
| 9,745,071 | B1 * | 8/2017 | Wang | B64D 1/14 |
| 11,597,516 | B1 * | 3/2023 | Klinkmueller | B64U 70/20 |
| 2013/0325213 | A1 * | 12/2013 | Mamidipudi | B64C 19/00 |
| | | | | 356/28 |
| 2017/0168161 | A1 * | 6/2017 | Shapira | G06F 16/50 |
| 2019/0120628 | A1 * | 4/2019 | Parras | G08G 5/59 |
| 2019/0170871 | A1 * | 6/2019 | Henderson | G01W 1/02 |
| 2020/0324902 | A1 | 10/2020 | Burgess et al. | |
| 2021/0254932 | A1 | 8/2021 | Baumgartner | |
| 2024/0059414 | A1 * | 2/2024 | Roenigk | B64D 47/00 |

FOREIGN PATENT DOCUMENTS

| | | | |
|---|---|---|---|
| JP | 2021021663 | A | 2/2021 |
| KR | 102322098 | B1 | 11/2021 |
| KR | 102382310 | B1 | 4/2022 |

OTHER PUBLICATIONS

Vasiljevic Nikola et al: "Wind sensing 8 with drone-mounted wind lidars: proof of concept", Atmospheric Measurement Techniques, vol. 13, No. 2, Feb. 7, 2020 (Feb. 7, 2020), pp. 521-536, XP093283653.

* cited by examiner

400

START

402

SUPPLY 4D WIND MEASUREMENT DATA FROM 4D WIND MEASUREMENT SYSTEM

404

CONTINUOUSLY SAMPLE THE 4D WIND MEASUREMENT DATA

406

ITERATIVELY PROCESS THE 4D WIND MEASUREMENT DATA, USING CARP MODEL, TO CALCULATE A FLIGHT PLAN FOR THE AIRCRAFT

408

ITERATIVELY PROCESS THE 4D WIND MEASUREMENT DATA, USING CARP MODEL, TOCALCULATEPRECISIONRELEASEPOINT FOR THEPAYLOAD

END

PRECISION AIRDROP SYSTEM AND METHOD

CROSS REFERENCE TO RELATED APPLICATION

The present application claims benefit of prior filed India Provisional Patent Application No. 202411032463, filed Apr. 24, 2024, which is hereby incorporated by reference herein in its entirety.

TECHNICAL FIELD

The present invention generally relates to computed airdrop release point (CARP) determination, and more particularly relates to a system and method for adaptively computing precise CARP for aircraft.

BACKGROUND

Currently, airdrop operations conducted by cargo aircraft require the aircraft to fly to a pre-calculated computed airdrop release point (CARP) that is based on the prior-day forecast and releases dropsondes to measure atmospheric wind velocity profile as function of altitude at points in time, wherever the sonde may drift. A go-round is maneuvered, and in a later, second pass a consolidated airdrop tool recalculates the CARP when combined with the outdated forecast and the stale dropsonde data. The new solution is manually transferred to the flight crew and entered to the flight management system (FMS), with significant latency. The crew then navigates—as best possible—with the remaining time margin (typically <minute) to reach the CARP position and prescribed aircraft state (heading, altitude, airspeed). These types of operations can result in significant errors.

Current airdrop approaches suffer significant drawbacks. First, aircraft must fly over the intended landing area one or more times, risking detection of intent, to measure wind and recalculate CARP. Multiple passes increases operation time and vulnerability to enemy aircraft and ground forces. Moreover, dropsonde data is not collected in the desired drop column that is needed by or representative of or optimal to models, which adds significant error to CARP solutions Hence, there is a need for a system and method that addresses the above-noted drawbacks.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an adaptive airdrop system for an aircraft carrying a payload includes a four-dimensional (4D) wind measurement system and a processing system. The 4D wind measurement system is configured to (i) continuously measure at least atmospheric wind velocity and direction at and within a first threshold distance around a current flight level of the aircraft, at and within a second threshold distance around a drop zone for the payload, and at and within a third threshold distance around a plurality of different altitudes and (ii) supply 4D wind data indicative thereof. The processing system is in operable communication with the 4D wind measurement system and configured to: (i) continuously sample the 4D wind data, (ii) implement a release point model, and (iii) iteratively process the 4D wind data to calculate, using the release point model, a flight plan for the aircraft and a precision release point for the payload.

In another embodiment, a method for calculating a flight plan and a precision release point for an aircraft carrying a payload includes supplying, from a four-dimensional (4D) wind measurement system, 4D wind data indicative of atmospheric wind velocity and direction (i) at and within a first threshold distance around a current flight level of the aircraft, (ii) at and within a second threshold distance around a drop zone for the payload, and (iii) at and within a third threshold distance around a plurality of different altitudes. The 4D wind data is continuously sampled, in a processing system, and is iteratively processes, in the processing system, to calculate, using a release point model implemented in the processing system, a flight plan for the aircraft and a precision release point for the payload.

In yet another embodiment, an aircraft includes a fuselage and an adaptive airdrop system. The fuselage is adapted to have a payload disposed therein. The adaptive airdrop system is disposed at least partially within the fuselage and includes a four-dimensional (4D) wind measurement system and a processing system. The 4D wind measurement system is configured to (i) continuously measure at least atmospheric wind velocity and direction at and within a first threshold distance around a current flight level of the aircraft, at and within a second threshold distance around a drop zone for the payload, and at and within a third threshold distance around a plurality of different altitudes and (ii) supply 4D wind data indicative thereof. The processing system is in operable communication with the 4D wind measurement system and is configured to: (i) continuously sample the 4D wind data, (ii) implement a release point model, and (iii) iteratively process the 4D wind data to calculate, using the release point model, a flight plan for the aircraft and a precision release point for the payload.

Furthermore, other desirable features and characteristics of the system and method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
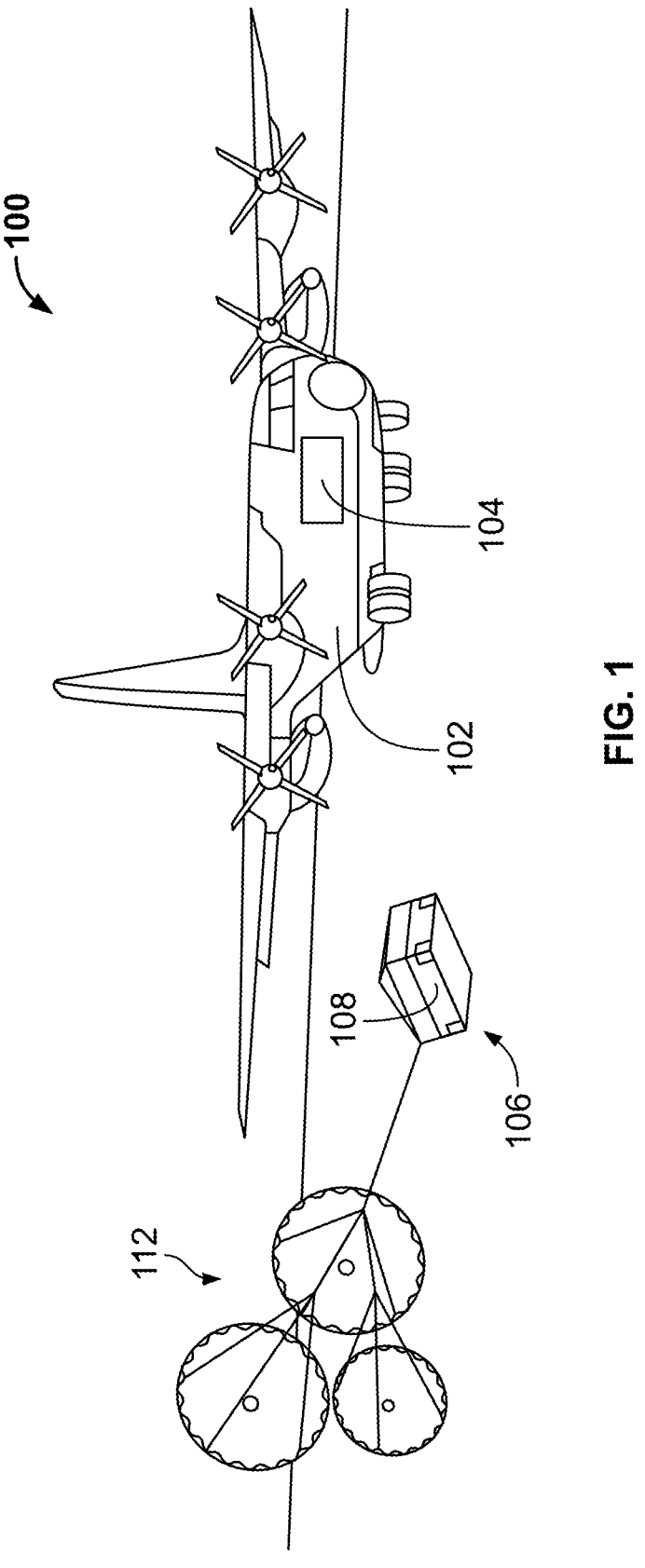
FIG. 1 depicts an aircraft and a released payload.

Referring to FIG. 1, an aircraft 100 is depicted therein. The aircraft 100 has a fuselage 102 and, disposed within the fuselage 102, a precision airdrop system 104. The precision airdrop system 104, which will be described in more detail momentarily, determines a more precise computer aided release point (CARP) for the payload 106 that is depicted as being airdropped from the aircraft 100. In the depicted embodiment, the payload 106 is a container delivery system (CDS) that includes one or more containers 108 coupled to a parachute 112. Although only one payload is depicted in FIG. 1, it will be appreciated that multiple payloads 106 could be airdropped from the aircraft 100.

Figure 2:
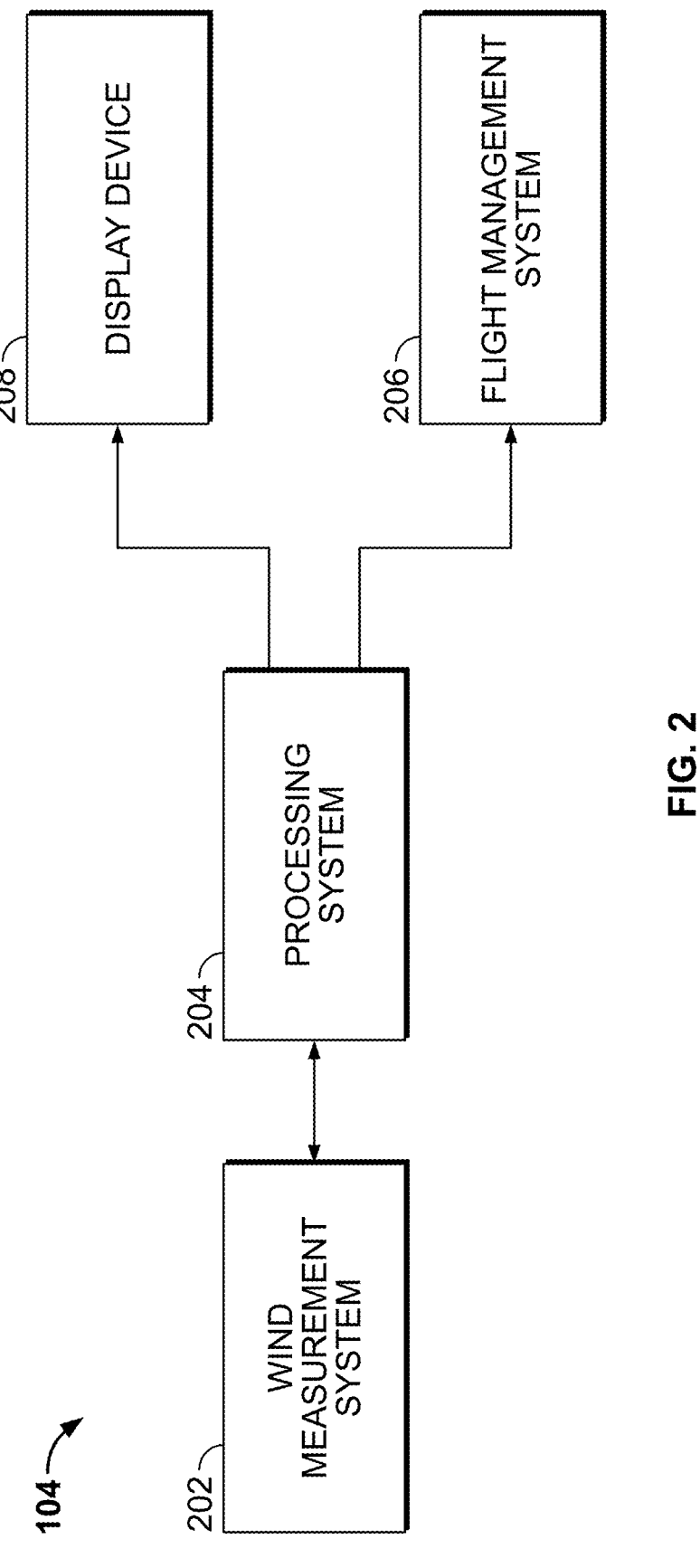
FIG. 2 depicts a functional block diagram of an adaptive airdrop system that may be implemented in the aircraft of FIG. 1.

Turning to FIG. 2, a functional block diagram of one embodiment of the precision airdrop system 104 is depicted and will now be described. The precision airdrop system 104 includes at least a four-dimensional (4D) wind measurement system 202, a processing system 204, a flight management system 206, and may also include a display device 208. The 4D wind measurement system 202 is configured to continuously measure at least atmospheric wind velocity and direction at a plurality of different locations and supply 4D wind data indicative of the measured atmospheric wind velocity and direction. The plurality of locations may vary but preferably include at least: (1) at and within a first threshold distance around the current flight level of the aircraft, (2) at and within a second threshold distance around a drop zone for the payload, and (3) at and within one or more third threshold distances around a plurality of different altitudes between the current flight level of the aircraft and the drop zone.

It will be appreciated that the relative values of the first, second, and third threshold distances may vary. In some instances, the threshold distances may all be equal. In other instances, one or all of the threshold distances may be unequal. For example, in some instances, the first threshold distance may be smaller than the second and third threshold distances. In such instances, the third threshold distances associated with each of the different altitudes may, if desired, increase as the as the plurality of different altitudes get closer to the ground. In other embodiments, the first and second threshold distances may be greater than each of the one or more third threshold distances. In this latter embodiment, all of the third threshold distances may be equal to each other or may vary. For completeness, it is noted that the first, second, and third threshold distances may vary from 0.2 NM to 5 NM, just to provide an example of suitable ranges.

It will additionally be appreciated that the 4D wind measurement system 202 may be implemented using various types of 4D wind measurement technologies. In one particular embodiment, however, it is implemented using an ultraviolet LIDAR (UV LIDAR) system. Moreover, the 4D wind measurement system 202 may be variously located and, in some embodiments, may be located at multiple locations. For example, in some embodiments, the 4D wind measurement system 202 may be located only on the ground (i.e., a ground-based system), or only in the aircraft 100 carrying the payload 106, or only in one or more separate aircraft (e.g., drones). In other embodiments, the 4D wind measurement system 202 may be located in the aircraft 100 carrying the payload 106, and on the ground, and located in the aircraft 100 carrying the payload and in one or more separate aircraft (e.g., drones). In still other embodiments, the 4D wind measurement system 202 may be a wholly airborne system that is located in the aircraft 100 carrying the payload 106 and in one or more separate aircraft (e.g., drones). This latter embodiment is depicted in more detail in FIG. 3 and with reference thereto will be briefly described. Before doing so, however, it is noted that when all or a portion of the 4D wind measurement system 202 are located separate from the aircraft 100, the 4D wind data supplied by the separate portions are transmitted, preferably wirelessly, to the aircraft 100, and more specifically to the processing system 204.

Figure 3:
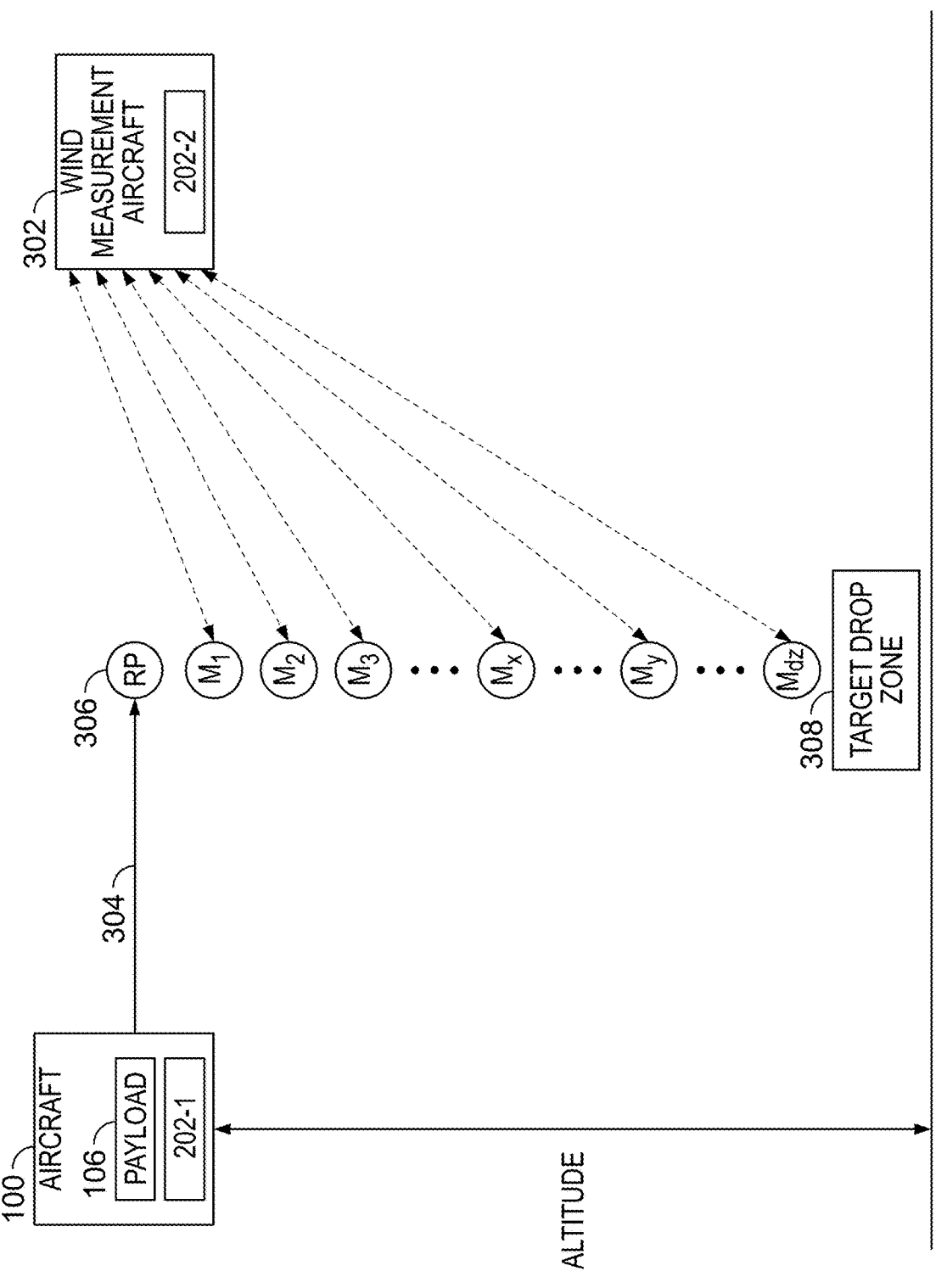
FIG. 3 depicts a functional block diagram of one embodiment of an implementation of the system of FIG. 2.

Turning now to FIG. 3, the 4D wind measurement system 202 is, as noted above, partially disposed within a separate aircraft 302 (e.g., a wind measurement aircraft). It should be noted that the wind measurement aircraft 302 is depicted in FIG. 3 as a single aircraft, but it could be implemented using multiple aircraft 302. In either case, the wind measurement aircraft 302 is depicted, for ease of illustration, as being located ahead of the current flight line 304 of the aircraft 100 that is carrying the payload 106, and ahead of the release point 306 (discussed in more detail below) for the payload 106. It will be appreciated, however, that the wind measurement aircraft 302 need not be located ahead of the current flight line 304. Indeed, the wind measurement aircraft 302 could be above, below, or offset horizontally or various other combinations. However, the wind measurement aircraft 304 should at least have visibility to the flight line 304, as well as the release point 306, the drop path, and the target drop zone 308 to measure the winds. As depicted, the aircraft 100 that is carrying the payload 106 includes a first portion of the 4D wind measurement system 202 (e.g., 202-1) and the wind measurement aircraft 302 includes a second portion the 4D wind measurement system 202 (e.g., 202-2). The second portion of the 4D wind measurement system 202-2 continuously measures at least atmospheric wind velocity and direction at a plurality of different altitudes. In the depicted embodiment, first portion of the 4D wind measurement system 202-1 continuously measures at least atmospheric wind velocity and direction at and within the first threshold distance around the current flight level of the aircraft 100, while the second portion of the 4D wind measurement system 202-2 continuously measures at least atmospheric wind velocity and direction at a plurality of different altitudes ($m_1$, $m_2$, $m_3$, . . . $m_{dz}$) from the release point 306 down to the target drop zone 308.

Returning now to FIG. 2, the processing system 204 generally represents the hardware, circuitry, processing logic, and/or other components configured to facilitate communications and/or interaction between the elements of the adaptive airdrop system 104 and perform additional processes, tasks and/or functions to support operation of the adaptive airdrop system 104, as described in greater detail below. Depending on the embodiment, the processing system 204 may be implemented or realized with a general-purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 204 includes processing logic that may be configured to carry out the functions, techniques, and processing tasks associated with the operation of the adaptive airdrop system 104 described in greater detail herein. Furthermore, the steps of a method or algorithm described in connection with the embodiments disclosed herein may be embodied directly in hardware, in firmware, in a software module executed by the processing system 204, or in any practical combination thereof. In accordance with one or more embodiments, the processing system 204 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 204, cause the processing system 204 to execute and perform one or more of the processes, tasks, operations, and/or functions described herein.

With the above in mind, it is noted that the processing system 204 is in operable communication with the 4D wind measurement system 202 and is configured to continuously sample the 4D wind data supplied by the 4D wind measurement system 202. The processing system 204, which is configured to implement a release point model, is further configured to iteratively process the 4D wind data to calculate, using the release point model, a flight plan for the aircraft 102 and a precision release point for the payload 106. The processing system 204 may additionally be configured to process the 4D wind data to calculate, using the release point model, a projected trajectory of the payload 106 if it is released from the precision release point.

The calculated flight plan and precision release point may also be supplied to the FMS 206 and, when included, may also be output for display on the display device 208. The FMS 206, as is generally known, is a specialized computer that automates a variety of in-flight tasks such as in-flight management of the flight plan for the aircraft 100. Using various sensors, such as a global positioning system (GPS) or Inertial Navigation System/Inertial Reference System (INS/IRS), the FMS determines the aircraft's position, orientation, and heading, and guides the aircraft 100 along its flight plan using flight plan data including, for example, the precision release point.

The display device 208, when included, is in operable communication with the processing system 204 and is responsive to display commands to render one or more images. It will be appreciated that the display device 208 can include any number and type of image generating devices on which one or more images may be rendered. In various embodiments, the display device 208 may be affixed to the static structure of the aircraft cockpit such as, for example, a Head Down Display (HDD) or Head Up Display (HUD) unit. Alternatively, the display device 208 may assume the form of a movable display device (e.g., a pilot-worn display device) or a portable display device, such as an Electronic Flight Bag (EFB), a laptop, or a tablet computer. Regardless of how the display device 208 is specifically implemented, the display commands, which are supplied from the processing system 204, cause the display device 208 to render images representative of at least the flight plan and the precision release point.

Figure 4:
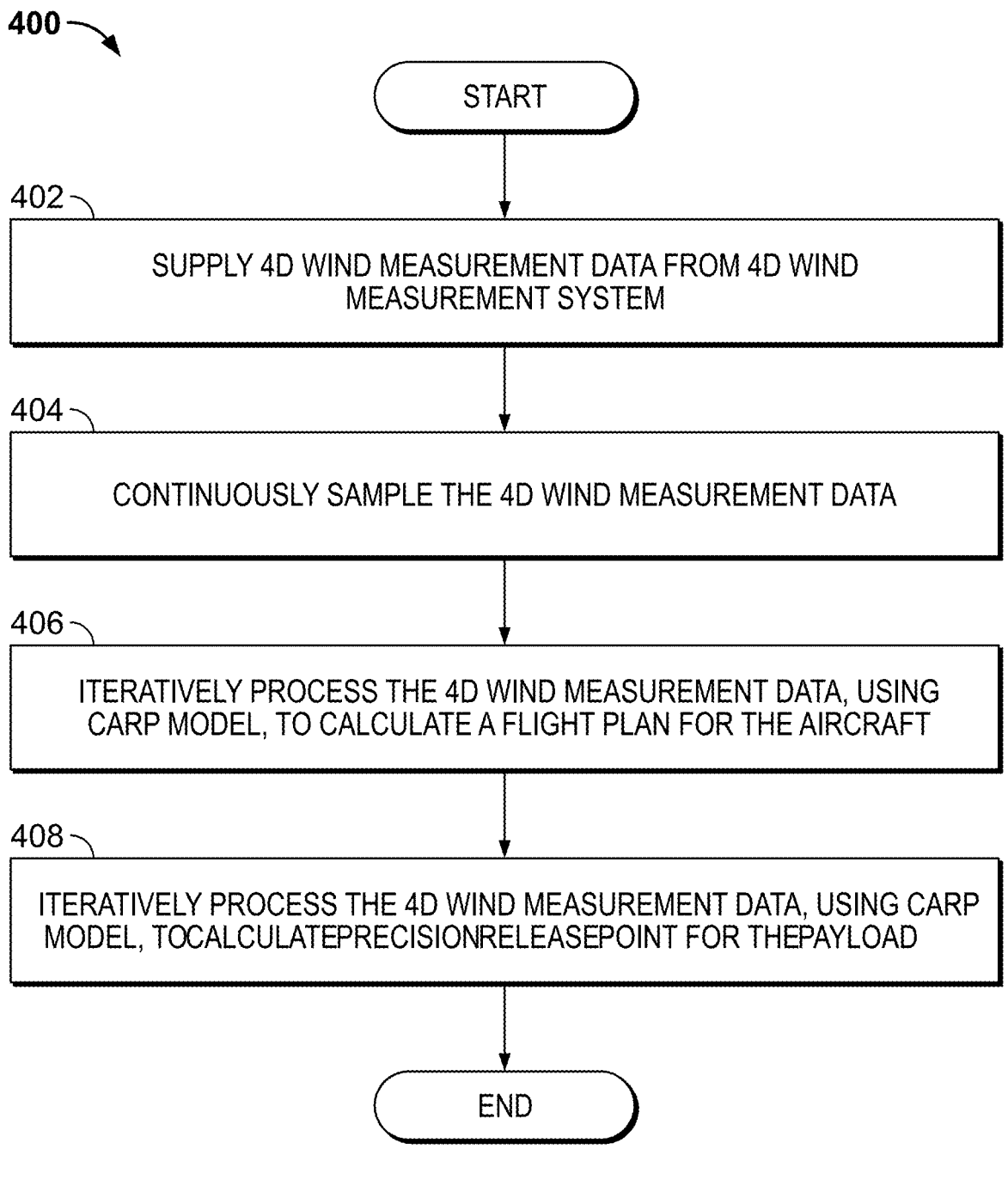
FIG. 4 depicts a method, in flowchart form, that may be implemented in the system of FIGS. 2 and 3.

Having described the overall functionality of the system 104, a description of a method for calculating a flight plan and a precision release point will now be described. The method 400, which is depicted in flowchart form in FIG. 4, represents various embodiments of a method for method for calculating a flight plan and a precision release point. For illustrative purposes, the following description of method 400 may refer to elements mentioned above in connection with FIGS. 2 and 3. In practice, portions of method 400 may be performed by different components of the described system 104. It should be appreciated that method 400 may include any number of additional or alternative tasks, the tasks shown in FIG. 4 need not be performed in the illustrated order, and method 400 may be incorporated into a more comprehensive procedure or method having additional functionality not described in detail herein. Moreover, one or more of the tasks shown in FIG. 4 could be omitted from an embodiment of the method 400 if the intended overall functionality remains intact.

The method 400 starts by supplying, from the 4D wind measurement system 202, the 4D wind measurement data (402). The processing system 204 continuously samples the 4D wind data supplied from the 4D wind measurement system 202 (404), The processing system 204, implementing a release point model, iteratively processes the 4D wind data to calculate a flight plan for the aircraft (406) and a precision release point for the payload (408).

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An adaptive airdrop system for an aircraft carrying a payload, comprising:

a four-dimensional (4D) wind measurement system configured to (i) continuously measure at least atmospheric wind velocity and direction at and within a first threshold distance around a current flight level of the aircraft, at and within a second threshold distance around a drop zone for the payload, and at and within a third threshold distance around a plurality of different altitudes and (ii) supply 4D wind data indicative thereof;

a processing system in operable communication with the 4D wind measurement system and configured to:

(i) continuously sample the 4D wind data, (ii) implement a release point model, and (iii) iteratively process the 4D wind data to calculate, using the release point model, a flight plan for the aircraft and a precision release point for the payload; and a flight management system (FMS) in operable communication with the processing system, the FMS configured to receive and implement the flight plan.

2. The system of claim 1, wherein the processing system is further configured to process the 4D wind data to calculate, using the release point model, a projected trajectory of the payload if it is released from the precision release point.

3. The system of claim 1, further comprising:

a display device in operable communication with the processing system, the display device configured to at least selectively display the flight plan and the precision release point.

4. The system of claim 1, wherein the 4D wind measurement system comprises an ultraviolet LIDAR (UV LIDAR) system.

5. The system of claim 1, wherein the 4D wind measurement system is a ground-based system.

6. The system of claim 1, wherein the 4D wind measurement system is disposed in at least one aircraft.

7. The system of claim 6, wherein the at least one aircraft is at least one unmanned aerial vehicle (UAV).

8. A method for calculating a flight plan and a precision release point for an aircraft carrying a payload, the method comprising the steps of:

supplying, from a four-dimensional (4D) wind measurement system, 4D wind data indicative of atmospheric wind velocity and direction (i) at and within a first threshold distance around a current flight level of the aircraft, (ii) at and within a second threshold distance around a drop zone for the payload, and (iii) at and within a third threshold distance around a plurality of different altitudes;

continuously sampling, in a processing system, the 4D wind data;

iteratively processing the 4D wind data in the processing system to calculate, using a release point model implemented in the processing system, a flight plan for the aircraft and a precision release point for the payload;

receiving the flight plan in a flight management system (FMS); and implementing the flight plan using the FMS.

9. The method of claim 8, further comprising:

calculating, using the release point model implemented in the processing system, a projected trajectory of the payload if it is released from the precision release point.

10. The method of claim 8, further comprising selectively displaying, on a display device, the flight plan and the precision release point.

11. The method of claim 8, wherein the 4D wind measurement system comprises an ultraviolet LIDAR (UV LIDAR) system.

12. The method of claim 8, wherein the 4D wind measurement system is a ground-based system.

13. The method of claim 8, wherein the 4D wind measurement system is disposed in at least one aircraft.

14. The method of claim 13, wherein the at least one aircraft is at least one unmanned aerial vehicle (UAV).

15. An aircraft, comprising:

a fuselage adapted to have a payload disposed therein; and an adaptive airdrop system disposed at least partially within the fuselage, the adaptive airdrop system comprising:

a four-dimensional (4D) wind measurement system configured to (i) continuously measure at least atmospheric wind velocity and direction at and within a first threshold distance around a current flight level of the aircraft, at and within a second threshold distance around a drop zone for the payload, and at and within a third threshold distance around a plurality of different altitudes and (ii) supply 4D wind data indicative thereof;

a processing system in operable communication with the 4D wind measurement system and configured to:

(i) continuously sample the 4D wind data, (ii) implement a release point model, and (iii) iteratively process the 4D wind data to calculate, using the release point model, a flight plan for the aircraft and a precision release point for the payload; and a flight management system (FMS) in operable communication with the processing system, the FMS configured to receive and implement the flight plan.

16. The aircraft of claim 15, wherein the processing system is further configured to process the 4D wind data to calculate, using the release point model, a projected trajectory of the payload if it is released from the precision release point.

17. The aircraft of claim 15, further comprising:

a display device in operable communication with the processing system, the display device configured to at least selectively display the flight plan and the precision release point.

* * * * *